(12) United States Patent
Schroeder et al.

(10) Patent No.: US 6,786,084 B2
(45) Date of Patent: Sep. 7, 2004

(54) SENSOR ASSEMBLY AND METHOD FOR NON-INTRUSIVELY SENSING INSTANTANEOUS SPEED OF THE ENGINE OF A VEHICLE

(75) Inventors: Thaddeus Schroeder, Rochester Hills, MI (US); Earl D. Diem, Ortonville, MI (US); Laci J. Jalics, Ray, MI (US); Francis E. Szczublewski, Macomb, MI (US)

(73) Assignee: Delphi Technologies, Inc., Troy, MI (US)

( * ) Notice: Subject to any disclaimer, the term of this patent is extended or adjusted under 35 U.S.C. 154(b) by 53 days.

(21) Appl. No.: 10/340,970

(22) Filed: Jan. 13, 2003

(65) Prior Publication Data

US 2004/0134266 A1 Jul. 15, 2004

(51) Int. Cl.⁷ .............................................. G01M 15/00
(52) U.S. Cl. ...................................................... 73/117.3
(58) Field of Search ................................ 73/116, 117.2, 73/117.3; 340/438–439, 441, 466, 467

(56) References Cited

U.S. PATENT DOCUMENTS

| | | | |
|---|---|---|---|
| 4,520,658 A | 6/1985 | Ryan et al. |
| 4,539,841 A | 9/1985 | Schroeder et al. |
| 4,936,277 A | 6/1990 | Deutsch et al. |
| 5,132,909 A | 7/1992 | Schroeder et al. |
| 6,215,285 B1 | 4/2001 | Harmon |
| 6,411,080 B1 | 6/2002 | Bach et al. |
| 6,546,911 B1 | 4/2003 | Fayyad et al. |

*Primary Examiner*—Edward Lefkowitz
*Assistant Examiner*—Maurice Stevens
(74) *Attorney, Agent, or Firm*—Jimmy L. Funke

(57) ABSTRACT

Sensor assembly and method for non-intrusively sensing instantaneous speed of an engine are provided. The engine includes a crankshaft have a respective end connected to an externally accessible bolt. The sensor assembly comprises a housing including a recess configured to affixingly engage the externally accessible bolt. The sensor assembly further comprises at least one motion-sensing device configured to provide a respective output signal indicative of angular motion information of the crankshaft. A signal transmitter coupled to the motion-sensing device configured to wirelessly transmit the output signal from the motion-sensing device.

18 Claims, 3 Drawing Sheets

SENSOR ASSEMBLY AND METHOD FOR NON-INTRUSIVELY SENSING INSTANTANEOUS SPEED OF THE ENGINE OF A VEHICLE

BACKGROUND OF THE INVENTION

The present invention is generally related to angular motion sensing, and, more particularly, to sensor assembly and techniques for non-intrusively sensing instantaneous speed of the engine of a vehicle, such as a land-based vehicle.

Engine rotational speed information, i.e., the speed of the crankshaft, may be needed for the control of engine operation, such as determining proper spark and fuel injection timing, gear shifting in automatic transmissions, etc. These control functions may require the average engine speed value over no less than one full revolution. The actual engine speed, however, is not constant. Even in a steady state, an internal combustion (IC) engine generally exhibits cyclical speed variations attributable to the operation of its cylinders. Each individual cylinder slows the engine during its compression cycle and speeds it up during its power cycle.

In the field of vehicular diagnostics, accurate instantaneous engine speed information enables the detection and diagnosis of many engine problems, even subtle ones. See, for example, U.S. Pat. Nos. 4,539,841 and 4,520,658, respectively titled "Method For Determining Engine Cylinder Compression Pressure and Power Output" and "Method For Locating Engine Top Dead Center Position," for some exemplary engine diagnostic applications that use instantaneous engine speed information. Presently, there is a limited choice in the ways of obtaining such information. For example, it is known that one can tap into the crank sensor wiring, or use a separate, intrusive sensing technique, such as mounting a sensor in the bell housing to sense the rotation of the ring gear.

Shortcomings of the first approach for obtaining instantaneous engine speed information may include burdensomely locating and gaining access to the crank sensor connector, the location of which connector typically varies from vehicle to vehicle. This generally results in incremental costs since even just a few additional minutes per vehicle cumulatively may add up to substantial costs when servicing a large number of vehicles. Secondly, the characteristics of the crank position signal commonly differ from one vehicle to another in terms of signal resolution (e.g. 6×, 24×, 60×), coding and format (e.g., analog or digital format). Similarly, costly and time-consuming inefficiencies may arise with the second approach for obtaining instantaneous engine speed information since intrusive sensing of engine speed is generally not conducive to quick and cost-effective servicing and/or diagnostics operations, and often requires costly vehicle modification.

What is desirable is a non-intrusive, user-friendly, easily attachable/detachable low-cost and reliable sensor assembly that would provide accurate instantaneous engine speed information. It would be further desirable to provide sensing techniques and sensor assembly that would result in highly accurate instantaneous engine crankshaft speed information independently of the RPM of the engine. It would be further desirable to provide sensor assembly and sensing techniques that would allow for accurately detecting variation of engine speed as well as the magnitude of the engine speed itself. It would be also desirable to provide a sensor assembly that may be universally used in a wide variety of vehicular configurations without any specialized training or tooling requirements from one vehicular configuration to another.

BRIEF SUMMARY OF THE INVENTION

Generally, the present invention fulfills the foregoing needs by providing in one aspect thereof, a sensor assembly for non-intrusively sensing instantaneous speed of an engine comprising a crankshaft having a respective end connected to an externally accessible bolt. The sensor assembly comprises a housing including a recess configured to affixingly engage the externally accessible bolt. The sensor assembly further comprises at least one motion-sensing device in the housing configured to provide a respective output signal indicative of angular motion information of the crankshaft. A signal transmitter coupled to the motion-sensing device configured to wirelessly transmit the output signal from the motion-sensing device.

In another aspect thereof, the present invention further fulfills the foregoing needs by providing a method for non-intrusively sensing instantaneous speed of an engine comprising a crankshaft having a respective end connected to an externally accessible bolt. The method allows affixing a sensor assembly to the externally accessible bolt. The method further allows providing at least one motion-sensing device in the sensor assembly configured to provide a respective output signal indicative of angular motion information of the crankshaft. A signal transmitter is coupled to the motion-sensing device to wirelessly transmit the output signal from the motion sensing device.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
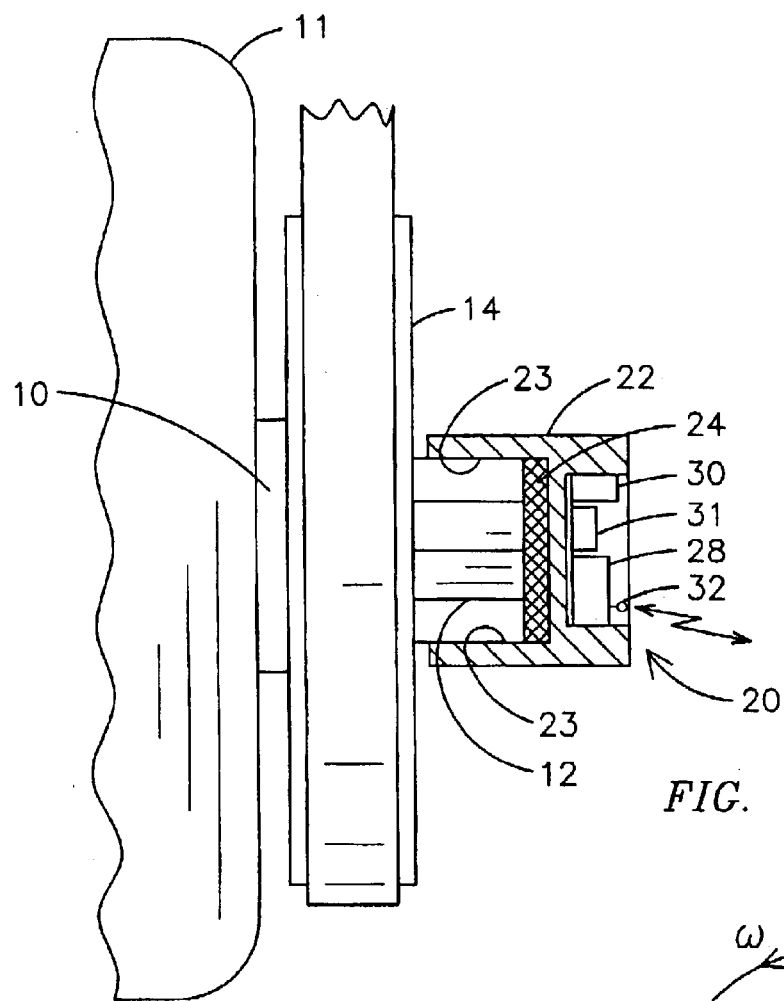
FIG. 1 illustrates a schematic of a sensor assembly for non-intrusively sensing instantaneous speed of an internal combustion engine such as may be used for engine diagnostic applications.

As suggested above, even in a steady state condition, an internal combustion (IC) engine may exhibit cyclical speed variations attributable to the operation of its cylinders. The frequency of these speed variation cycles depends on factors, such as the number of cylinders in the engine and whether the engine is of a two or a four-cycle type. In two cycle engines, each of the cylinders undergoes respective compression and firing actions during each engine revolution. Hence, there will be as many speed cycles per engine revolution as there are cylinders, and they will be spaced 360/n crank angle degrees (CAD) apart, where n is the number of cylinders. In four cycle engines, one half of the cylinders undergoes respective compression and firing actions during one engine revolution, the other half—during the following revolution. In this case there will be n/2 speed cycles per revolution and they will be spaced 720/n CAD apart.

The magnitude of these speed variations may depend on factors, such as the compression ratio of the engine, number of cylinders (more specifically, the degree of overlap of compression and firing cycles between the adjacent in firing order cylinders), engine speed and load. For example, in an idling four-cylinder diesel engine, the magnitude of speed variations can be as high as 200 RPM, in an idling four-cylinder gasoline engine—60 RPM, and 40 RPM in an 8-cylinder engine.

It is noted that in any practical embodiment any signal or data indicative of instantaneous engine speed information should be obtained directly from the crankshaft of the engine of the vehicle. For example, one may conceptually consider using any of the belt-driven pulleys or other rotating accessories in the vehicle to extract engine speed information, since such pulleys or accessories may be readily accessible. Such information, however, would likely be affected by the fairly complex dynamics of the harmonic balancer and the drive belt, and, in practice, may differ considerably from the actual crank speed of the engine.

It is believed that in one exemplary embodiment, one prime sensing location where a crankshaft 10 of an engine 11 may be non-intrusively accessible is through the head of a bolt 12 for attaching a belt-driving pulley 14 to a respective end of the crankshaft, such as in the front of the engine. The inventor of the present invention has innovatively recognized a relatively inexpensive wireless sensor assembly 20 that is easily mounted/demounted on such non-intrusively accessible location.

In one exemplary embodiment, components that make up the sensor assembly may be housed in a housing 22 configured to define a recess 23 engageable with the bolt head in a similar fashion as a wrench socket would be insertable over a hex nut, for example. In one exemplary embodiment, the sensor assembly would be securely held in place relative to the bolt head by a permanent magnet 24, such as may be affixed at the bottom of the recess. It will be appreciated that providing a permanent magnet is just one example of a quick and secure mounting arrangement for the sensor assembly since non-magnetic mounting arrangements, such as anchor posts or snappable clamps, may be used to implement the mechanical affixing of the sensor assembly to the bolt head.

As illustrated in FIG. 1, it is contemplated that in one exemplary embodiment, the sensor assembly may comprise at least one miniaturized motion-sensing device 30, a signal transmitter 28, such as a radio frequency (RF) transmitter, infrared transmitter, ultrasound transmitter, or any other transmitter device capable of wirelessly transmitting information, and a self-contained power source 31, such as a relatively small rechargeable battery. In one exemplary embodiment, an external power source may be coupled through inductive coupling, for example, for powering the sensor assembly.

Figure 2:
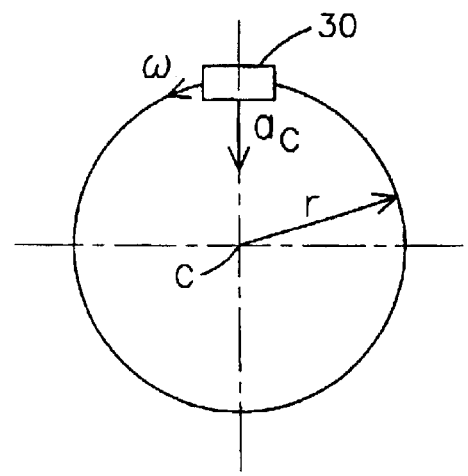
FIG. 2 illustrates an exemplary embodiment of the sensor assembly of FIG. 1 comprising an accelerometer aligned to sense centripetal acceleration.

In one exemplary embodiment, the motion-sensing device may be an integrated circuit (IC) device, such as an accelerometer having its sensing axis aligned to sense centripetal acceleration. As illustrated in FIG. 2, when a body, such as a rotating accelerometer 30, revolves around a center of rotation C, such a body would be affected by centripetal acceleration, (represented by the arrow labeled with the letter "a") directed toward the center of rotation. Thus, placing a properly oriented accelerometer within the housing of the sensor assembly at an appropriate distance r from the center of rotation would permit to continuously sense angular speed. As will be appreciated by those skilled in the art, the output signal from accelerometer 30 would be proportional to the product of radius r and the square of the angular velocity. The accelerometer output signal could be processed in a microprocessor programmed to compute the magnitude of the angular velocity of the engine. However, for engine diagnostic purposes it might be optionally desired to directly use the square of the angular velocity since the quadratic factor could advantageously enhance detection of engine speed variation. Typically, the relative magnitude of engine speed variation declines with increasing engine speeds.

Figure 3:
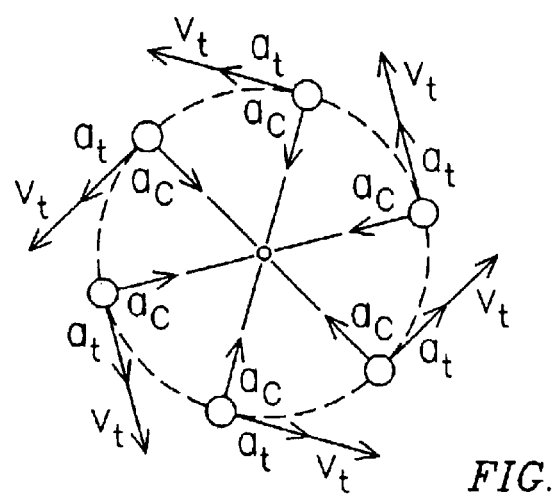
FIG. 3 conceptually illustrates two distinctive kinds of acceleration, such as centripetal and/or tangential acceleration, that may be sensed by the sensor assembly of FIG. 1.

In another exemplary embodiment, the accelerometer may be optionally arranged to sense tangential acceleration. As illustrated in FIG. 3, one can align the sensing axis of a suitable motion-sensing device to be positioned 90 degrees relative to the centripetal acceleration to sense angular acceleration based on sensing tangential speed changes (represented by the arrows labeled with the letter "v"). It will be appreciated that if the motion-sensing device is arranged to sense centripetal acceleration, then care should be taken to ensure that the ratings of that device can tolerate and measure hundred of Gs. For example, if the accelerometer is placed 10 mm from the center of rotation, i.e., r=10 mm, the accelerometer may be subjected to an acceleration of approximately 1.0 G at 300 RPM, and 400 Gs at 6000 RPM. One example of a relatively low-cost, off-the-shelf miniaturized IC accelerometer suitable for the centripetal sensing may be the accelerometer identified with part number MMA1200D and commercially available from Motorola. The volumetric footprint of such an exemplary accelerometer is approximately 10×7.5×3.5 mm. As discussed in greater detail below, signal transmitter 28 may be configured to generate a signal carrier at an appropriate frequency. The signal carrier would be modulated by the accelerometer output signal using modulation techniques well understood by those skilled in the art, such as amplitude modulation, frequency modulation, pulse-width modulation, etc. The modulating signal can be in either analog or digital format.

The discussion below provides some insight regarding the physical and mathematical principles involved in connection with the motion of the rotating crankshaft. That is, in connection with the two distinctive kinds of acceleration present in the rotating crankshaft as illustrated in FIG. 3:

1. Centripetal, which is oriented radially and is responsive to both components (constant and variable) of the crankshaft speed as given by Eq.1 below.

$$a_c = \frac{V_c^2}{r_c} = r_c \cdot \omega^2 \quad (1)$$

where $a_c$—centripetal acceleration at a distance $r_c$ from the center of rotation $r_c$—distance of the centripetal accelerometer from the center of rotation $V_c$—tangential velocity at the distance $r_c$ from the center of rotation $\omega$—angular velocity of the shaft and the accelerometer 2. Tangential (or angular), which is acceleration oriented tangentially and is manifested when the rotating shaft comprises angular speed variations, which the engine crankshaft does. This tangential acceleration is given by Eq.2 below.

$$a_t = \frac{dV_t}{dt} = r_t \cdot \frac{d\omega}{dt} = r_t \cdot \frac{d\omega}{d\alpha} \cdot \frac{d\alpha}{dt} = r_1 \cdot \omega \cdot \frac{d\omega}{d\alpha} \quad (2)$$

where $a_t$—tangential acceleration at a distance $r_t$ from the center of rotation $r_t$—distance of the tangential accelerometer from the center of rotation $\alpha$—angle of rotation $\omega$—angular velocity of the shaft and the accelerometer For readers desirous of additional background information regarding general principles of angular motion, reference is made to Chapter 9 of textbook titled "University Physics" by Sears, Zemansky and Young, 5$^{th}$ edition, which chapter is herein incorporated by reference.

Figure 4:
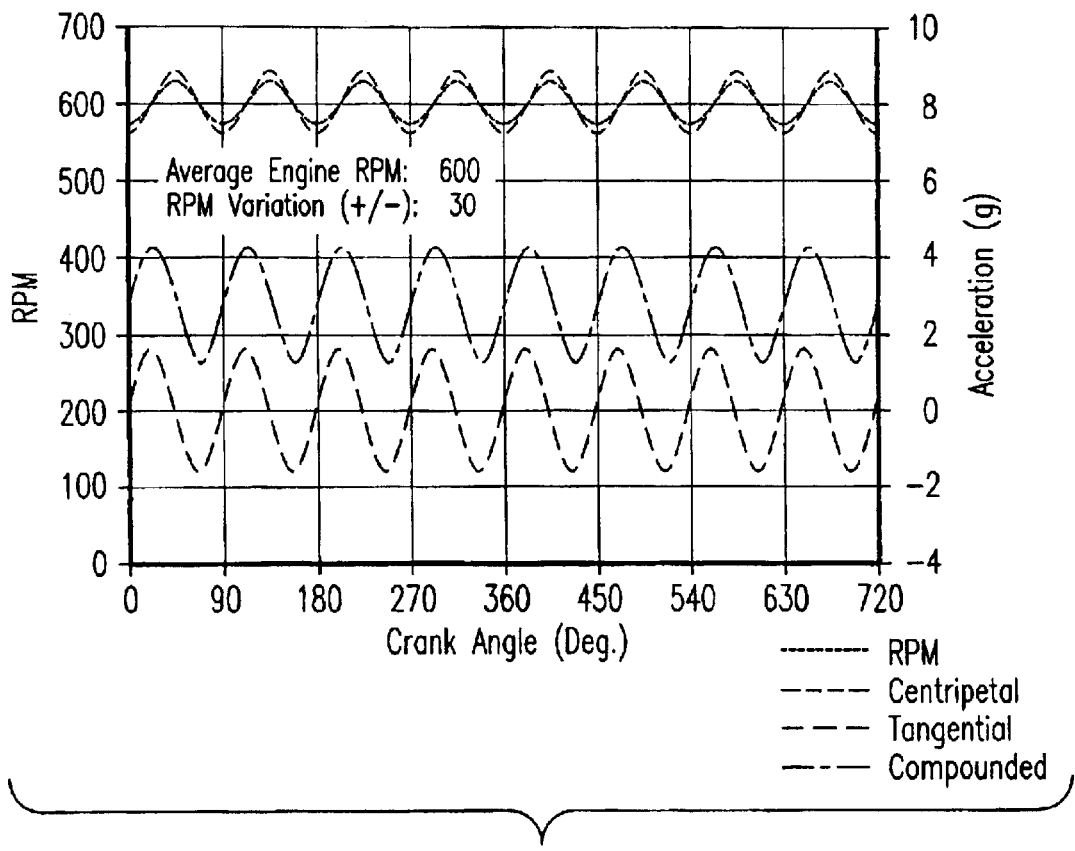
FIG. 4 shows an exemplary engine speed trace over two revolutions for an 8 cylinder engine idling at approximately 600 RPM with corresponding centripetal and tangential accelerations.

FIG. 4 shows an exemplary speed trace over two revolutions for an eight cylinder engine idling at approximately 600 RPM with the corresponding centripetal and tangential accelerations. As it is customary in the automotive field, the engine angular speed $\omega$ is expressed in RPM units, and the acceleration in units of g (gravitational acceleration g=9.81 m/s$^2$). The conversion from RPM to rad/s is given by the formula $$\omega = 2\pi(RPM)/60 \quad (3)$$

As suggested above, the centripetal acceleration comprises an absolute value of instantaneous engine speed—one just needs to scale the accelerometer output signal and compute a square root value. As suggested above, some engine diagnostics may optionally utilize the square of instantaneous engine speed, and in such cases the signal could be used in its unprocessed form.

Conversely, the tangential acceleration comprises just the derivative of speed variations and would require an operation comprising a mathematical integration to calculate engine speed information. In this case, the signal comprising tangential acceleration would not provide a constant component of the engine speed, as the signal comprising centripetal acceleration does.

By way of example, assuming a rising average engine speed, the magnitude of the signal indicative of centripetal acceleration would increase relatively rapidly due to its quadratic characteristics and its component corresponding to the speed variation would decrease from approximately 24% of the steady state value at 500 RPM to just about 2% at 6000 RPM. By way of comparison, the tangential acceleration signal would be directly attributable to the engine speed variations and it would have a larger magnitude (peak-to-peak value), even assuming that respective acceleration sensors for sensing centripetal and tangential acceleration are placed an equal distance from the center of rotation (i.e., $r_c = r_t$).

In a practical implementation, the high value of the centripetal acceleration at high engine speeds may restrict how far away from the center of rotation the centripetal acceleration sensor could be placed. Inexpensive integrated commercial automotive acceleration sensors typically are not designed to operate beyond 450 g, which translates into a distance $r_c$ of about 10 mm at 6000 RPM. The tangential acceleration, however, could be measured by such an inexpensive acceleration sensor placed farther away from the center of rotation (and properly oriented) without exceeding the maximum range of the sensor. With a greater distance $r_t$ such sensor can provide a larger signal and be less sensitive to effects of possible eccentricity since the amount of radial play $\Delta r_t$ would become a smaller fraction of distance $r_t$.

As stated above, a motion-sensing device arranged to sense centripetal acceleration would supply a signal indicative of the square of angular speed. Any angular speed variation would be superimposed on the signal supplied by the motion-sensing device. Because of the high level of Gs expected for centripetal acceleration sensing, the quadratic component of angular speed present in the accelerometer output signal would be analogous to a relatively large DC bias and any angular speed variation would be analogous to a relatively small AC variation superimposed on the relatively large DC bias. By way of comparison, if a motion-sensing device was arranged to sense tangential acceleration, then the output signal from such a sensing device would be indicative of just the angular speed variation. That is, the signal would be free from the relatively large DC component corresponding to the quadratic component of angular speed present in centripetal sensing.

The inventor of the present invention in yet another aspect thereof has innovatively recognized that a hybrid motion-sensing approach for measuring engine speed information may be desirable in some applications because of its complementary characteristics over a wide spectrum of operational conditions of the engine. As used herein hybrid-motion sensing refers to sensing of angular motion that is based on sensing both centripetal and tangential acceleration.

It will be appreciated that, in general, the sensor assembly may comprise either a single motion sensing device arranged to sense centripetal acceleration, or a single sensing device arranged to sense tangential acceleration, or, in the hybrid motion-sensing technique, the sensor assembly would integratedly combine both of such motion-sensing devices, or, as described below in the context of FIG. 5, a single accelerometer may be appropriately oriented to sense vectorial components of both centripetal and tangential acceleration. For example, at relatively low engine RPM the tangential acceleration sensing approach may advantageously provide increased signal sensitivity because the relatively small AC signal indicative of angular speed variation would not be affected by the relatively large DC bias that would be generally present in the centripetal sensing approach. In some diagnostic applications, it may be desirable to provide both RPM variation as well as an average value of the magnitude of the engine RPM, and for such applications having the centripetal acceleration sensing would be desirable.

Figure 5:
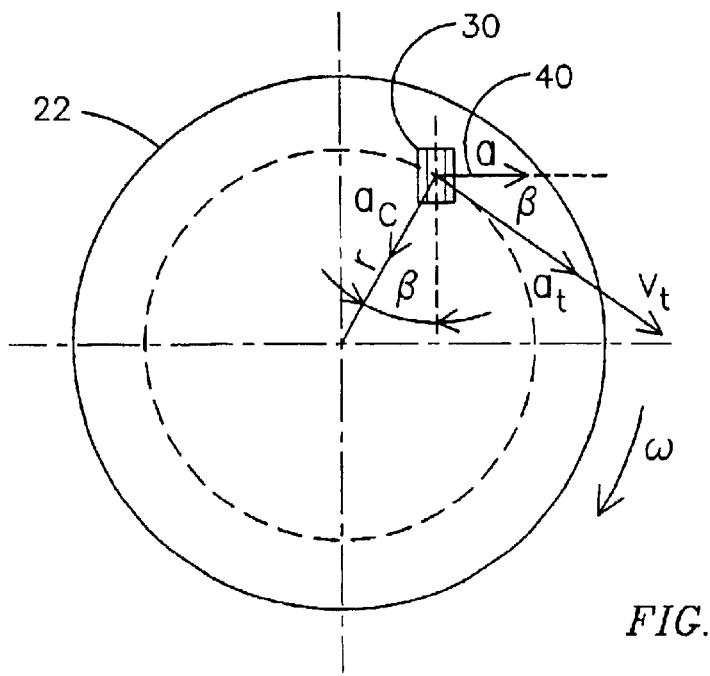
FIG. 5 illustrates an exemplary embodiment of the sensor assembly of FIG. 1 comprising a single accelerometer having a sensing axis oriented to sense vectorial components of both centripetal and tangential acceleration.

In another exemplary embodiment, the above-described combination of both types of acceleration into a single signal can be optionally obtained by employing a single acceleration sensor partially rotated as shown in FIG. 5, in lieu of two separate accelerometers. The accelerometer that may be used in this exemplary embodiment may comprise a single axis of sensitivity. (See for example the axis of sensitivity represented by dashed line 40 for the single axis accelerometer 30 of FIG. 5.)

Positioning the axis of sensitivity of the single accelerometer by an angle β from the radial direction will result in an accelerometer output signal comprising both centripetal and angular components.

$$a = a_c \cos(90° + \beta) + a_t \cos \beta \quad (4)$$

Entering the formulas for $a_c$ and $a_t$ (equations 1 and 2) and using a common value of r for $r_c$ and $r_t$ yields $$a = k_c \cdot \omega^2 + k_t \cdot \frac{d\omega}{dt} \quad (5)$$

where $k_c = r \cdot \cos(90° + \beta)$ and $k_t = r \cdot \cos \beta$ are constants determined for any given sensor design. In this exemplary embodiment, just one signal will be transmitted over a single channel to the diagnostic unit, which will compute the instantaneous engine speed.

In the event of a hybrid motion-sensing technique that uses two distinct accelerometers, transmitter 28 may be configured to simultaneously transmit at two distinct frequencies being sufficiently apart to avoid interference with one another. One of the frequencies would be used to carry the centripetal acceleration information and the other frequency would be used to carry the tangential acceleration information. It will be appreciated, however, that there is a variety of ways for transmitting the hybrid acceleration information. For example, in lieu of simultaneously transmitting each respective acceleration information one could sequentially transmit time-tagged data blocks carrying each respective acceleration information. For example, the sensor assembly may include a memory for storing respective data blocks of acceleration information and the transmitter could be configured to first send information from one of the angular motion-sensing devices, and then from the other device on the same communication channel.

Assuming a digital format of 16 bits, another example for transmitting the hybrid acceleration information may be to encode the digital information to readily identify the source of the acceleration information. Let us say the first 10 bits could be used to carry angular motion information from one of the motion sensing devices (e.g., the centripetal acceleration sensing device) and the next 6 bits could be used to carry information from the other motion-sensing device (e.g., the tangential acceleration sensing device). It will be appreciated that the bandwidth requirements of the communication channel enabled by the transmitter are relatively straightforward. For example, assuming the highest engine speed is 6,000 RPM, (approximately 100 hertz), and further assuming that one conservatively chooses the upper limit of the communication channel bandwidth to be 100 times away from the highest frequency in the modulating signal, that would result in a bandwidth of just 10 kilohertz. Thus, as suggested above, the wireless transmission of the angular motion information may be readily accomplished in a variety of uncomplicated and inexpensive ways. The angular motion information from the transmitter would be electrically coupled to a suitable antenna 32 to be wirelessly transmitted to an eternally-based receiver (not shown), which may be part of an engine diagnostic system, such as disclosed in the patents cited in the background section of this specification.

It is believed that a sensor assembly comprising just the centripetal acceleration sensor will provide the required instantaneous engine speed information, albeit with a possible reduction of accuracy at high engine speeds. Similarly, a sensor assembly with the tangential acceleration sensor alone would provide useful and accurate engine diagnostic information, although with some lesser flexibility since the constant component of the engine speed would not be available. It is believed that a sensor assembly comprising a hybrid acceleration sensing approach may provide a desirable and practical implementation since it would include the advantages provided by each acceleration sensing technique.

Figure 6:
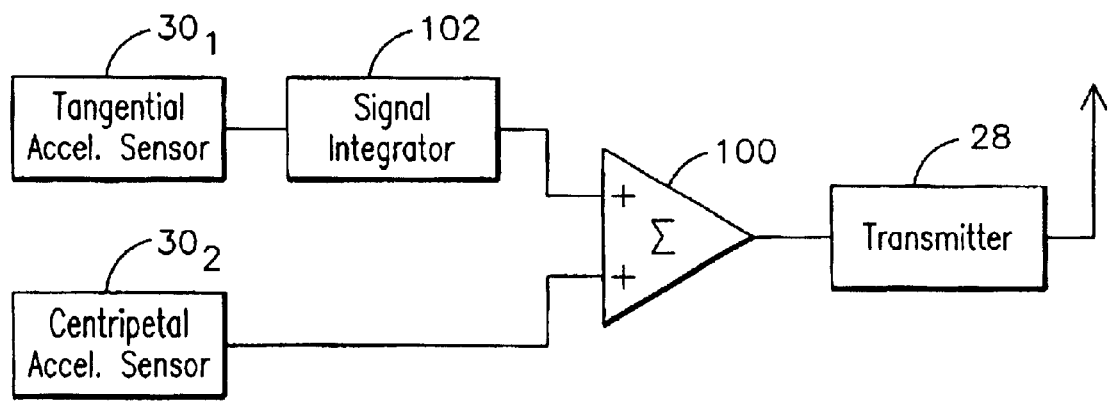
FIG. 6 is a block diagram of a signal processing circuit that in one exemplary embodiment may be part of the sensor assembly of FIG. 1.

As suggested above, in one exemplary embodiment, the motion-sensing assembly might comprise a single, dual axis acceleration sensor. For the sake of design flexibility and lower cost, however, it might be desirable for some applications to use two relatively low-cost, individual acceleration sensors located at their own respective appropriate distance from the center of rotation. The use of two sensors would provide a degree of redundancy and also enhance the overall speed sensing accuracy by combining the average engine speed signal extracted from the centripetal acceleration with the higher accuracy speed variation signal derived from the tangential acceleration. The derivation and combining of these two signals could be performed within the sensor assembly prior to the wireless transmission to the external diagnostic unit. One exemplary technique for combining these two signals into a single enhanced signal would be to add in a summer 100 the centripetal signal with an integral of the tangential signal, as may be obtained from a signal integrator 102, as illustrated in FIG. 6. Under this technique, using a single hybrid acceleration signal, a straightforward single channel transmitter in the sensor assembly would suffice to transmit the information to the external receiver.

Figure 7:
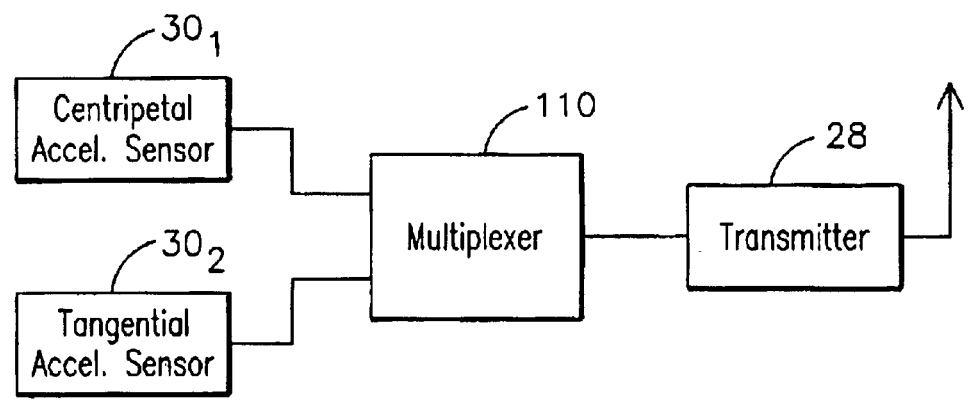
FIG. 7 is a block diagram of exemplary multiplexing circuitry that may be used in one exemplary embodiment for transmitting the tangential and centripetal signals to equipment external to the sensor assembly of FIG. 1.
Figure 8:
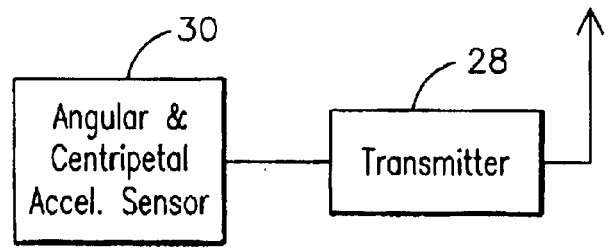
FIG. 8 is a block diagram of exemplary basic circuitry that may be used in one exemplary embodiment for transmitting a hybrid acceleration signal.

Alternatively, as suggested above, each acceleration signal could be transmitted out, either on two separate channels or multiplexed on a single channel using a multiplexer 110, as illustrated in FIG. 7. As will be appreciated by those skilled in the art, having both acceleration signals available to the diagnostic unit could enhance the diagnostic capabilities since the diagnostic unit would likely comprise substantial processing capability for extracting valuable information regarding the condition of the engine, based on the hybrid acceleration information. It will be appreciated that a sensor assembly without any signal processing circuitry, such as illustrated in FIG. 8, would be simpler and less expensive than one that includes such signal processing circuitry within the sensor assembly.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A sensor assembly for non-intrusively sensing instantaneous speed of an engine comprising a crankshaft having a respective end rotatingly connected to an externally accessible bolt, the sensor assembly comprising:

a housing comprising a recess configured to affixingly engage the externally accessible bolt;

at least one motion-sensing device in the housing configured to provide a respective output signal indicative of angular motion information of the crankshaft; and a signal transmitter coupled to the motion-sensing device configured to wirelessly transmit the output signal from the motion sensing device.

2. The sensor assembly of claim 1 wherein the at least one motion-sensing device comprises a single-axis accelerometer positioned to sense vectorial components of centripetal and tangential acceleration.

3. The sensor assembly of claim 1 wherein the at least one motion-sensing device comprises an accelerometer arranged to sense centripetal acceleration.

4. The sensor assembly of claim 1 wherein the at least one motion-sensing device comprises an accelerometer arranged to sense tangential acceleration.

5. The sensor assembly of claim 1 wherein the at least one motion-sensing device comprises a first accelerometer arranged to sense centripetal acceleration, and a second accelerometer arranged to sense tangential acceleration.

6. The sensor assembly of claim 5 further comprising signal processing circuitry for combining the centripetal and tangential acceleration into a single signal.

7. The sensor assembly of claim 5 wherein the signal processing circuitry comprises a summer coupled to receive the centripetal accelerator, and further coupled to receive a signal indicative of an integral of the tangential acceleration.

8. The sensor assembly of claim 1 further comprising a magnet affixed at the bottom of the recess to provide a secure mechanical coupling relative to the externally-accessible bolt.

9. The sensor assembly of claim 5 wherein the transmitter is configured to simultaneously transmit acceleration information from the first accelerometer at a first frequency, and acceleration information from the second accelerometer at a second frequency sufficiently apart from the first frequency to avoid interference therebetween.

10. The sensor assembly of claim 5 wherein the transmitter is configured to sequentially transmit time-tagged data blocks of acceleration information from each of the first and second accelerometers at a single frequency.

11. A method for non-intrusively sensing instantaneous speed of an engine comprising a crankshaft having a respective end rotatingly connected to an externally accessible bolt, the method comprising:

affixing a sensor assembly to the externally accessible bolt;

providing at least one motion-sensing device in the sensor assembly configured to provide a respective output signal indicative of angular motion information of the crankshaft; and coupling a signal transmitter to the motion-sensing device to wirelessly transmit the output signal from the motion sensing device.

12. The method of claim 11 wherein the at least one motion-sensing device comprises a single-axis accelerometer and the method further comprises positioning the single-axis accelerometer to sense vectorial components of centripetal and tangential acceleration.

13. The method of claim 11 further comprising arranging the at least one motion-sensing device to sense centripetal acceleration.

14. The method of claim 11 further comprising arranging the at least one motion-sensing device to sense tangential acceleration.

15. The method of claim 11 further comprising arranging the at least one motion-sensing device to sense centripetal and tangential acceleration.

16. The method of claim 11 further comprising affixing a magnet at the bottom of a recess in a housing of the sensor assembly to provide a secure mechanical coupling relative to the externally-accessible bolt.

17. The method of claim 15 further comprising configuring the transmitter for simultaneously transmitting centripetal acceleration at a first frequency, and tangential acceleration at a second frequency sufficiently apart from the first frequency to avoid interference therebetween.

18. The method of claim 15 further comprising configuring the transmitter for sequentially transmitting data blocks of time-tagged acceleration information at a single frequency, wherein the time-tagging is configured to identify whether the acceleration information comprises centripetal or tangential acceleration.

* * * * *